T. C. AVERY.
Electric Battery.
No. 25,710.
Patented Oct. 11, 1859
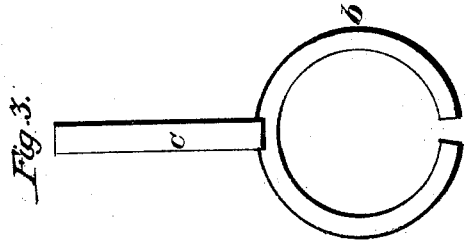
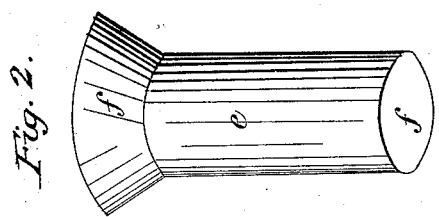
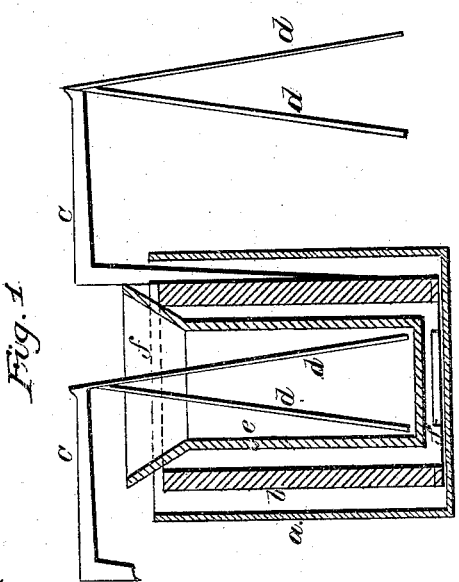
Witnesses:
W. J Brundred
Charly L Barrett
Inventor:
Thos. C. Avery

UNITED STATES PATENT OFFICE.

THOMAS C. AVERY, OF NEW YORK, N. Y.

IMPROVED GALVANIC BATTERY.

Specification forming part of Letters Patent No. 25,710, dated October 11, 1859.

*To all whom it may concern:*

Be it known that I, THOMAS C. AVERY, of the city, county, and State of New York, have invented certain new and useful improvements in the mode of constructing and operating batteries for generating or exciting by chemical decomposition electrical action for telegraphic purposes, which I have designated as "Avery's Galvanic Battery;" and I do hereby declare the following to be a full description of the same.

My improvements are based upon what is generally known as the "Grove battery," as the one commonly used for telegraphic purposes in this country, though they are equally applicable to the Smee battery, as well as others.

It is well known among telegraphic operators that with the Grove battery there is a great difficulty in keeping up a constant and uniform current of electrical action. This irregularity of action has been ascribed to various causes; but from extended observations I have become satisfied that the substantial cause for this irregularity of electrical action is due to local action generated in the battery in consequence of imperfect amalgamation of the surfaces of the zincs and a want of due proportioning of the platinum and zincs to be acted upon, as well as to a want of proper circulation of the exciting-fluids to act with the greatest energy upon the metals.

The nature of my invention consists in amalgamating the outside of the zinc cups by an amalgam very little susceptible to any action from the sulphuric acid, and thus leaving the inner surface of the zinc to be acted upon by the nitro-sulphuric acid directly opposite to the surfaces of the platinum, to prevent local action in consequence of the difference of degree of intensity of the exciting-fluids on the external and internal surfaces of the zincs, as is the case in the Grove battery; second, in the use of two or more pieces of platinum in the porous cups instead of one entire piece, as commonly used in the Grove battery, to cause a greater amount of exciting-surface in the negative current, to increase the quantity and intensity thereof, to prevent it from escaping from the wire conductors of a telegraph in damp or stormy weather, as is the case when the current of electricity is weak.

To describe my invention more fully, I will refer to the accompanying drawings, forming a part of this specification, the same letters of reference, wherever they occur, referring to like parts.

Figure 1 is a cut section of one of the cups of the battery. Fig. 2 is a view of one of the porous cups. Fig. 3 is a plan view of one of the zinc cups.

Letter $a$ is a glass cup, in which is placed a cylinder of zinc, $b$, of the usual form of the zincs used in the Grove battery. These zinc cups are amagamated on their inner surfaces by a wash of mercury and on their external surfaces by an insulating-amalgam composed of the following materials, to wit: three pounds of mercury; three and a half pounds of lead, (or six pounds of tin, if preferred;) three drams of rosin; three drams of hard tallow, prepared as follows: First, fuse the lead in any suitable pot. When fused, skim off the dross and remove from the fire; second, now add to the molten lead the mercury, rosin, and tallow, and stir the whole mass thoroughly and constantly until the amalgam gets cold, when it will appear like a granulated paste-like powder.

The object of the use of the rosin and tallow is to disintegrate the particles of lead and mercury. If they were not used, the lead and mercury, on getting cold, would become crystallized or hard and impracticable of use, and it is therefore essential that they should be used in the proportions set forth; otherwise the amalgam could not be applied. To do this the surface of the zinc is cleaned with sulphuric acid, and then with a hard brush the insulating-amalgam is thoroughly rubbed on the outside surface of the zinc until completely amalgamated, when they are fit for use.

To one side of the zinc cups is an arm, $c$, having soldered to its outer end two (or more, if desired) strips of platinum, $d\ d$.

The object of the use of two or more strips of platinum, in contradistinction to the use of one, as constituting the peculiarity of the Grove battery, is, first, to obtain a greater area of surface of platinum to be acted upon by the nitric acid, and thus excite a greater amount of electrical action in the negative pole of the battery to intensify the current and give greater uniformity of force to it in its transmission over the telegraphic wires; and, second, to distribute the exciting-surfaces of the platinum throughout the interior of the porous cups to obtain a diffused action of the nitric acid by establishing a circulation of it, and thereby bring new portions of the acid in contact with the platinum to preserve the constancy of the battery and sustain its energy.

Letter $e$ is a porous cup having a funnel-shaped mouth, the object of which is to suspend them upon the upper edges of the zincs and equidistant from their internal surfaces. The outer and inner surfaces of the funnel, as well as the bottom of the porous cups, are coated with wax $f$, as shown by the yellow coloring of those parts. The object of this is to confine the action of the nitric and sulphuric acids to the body of the metals submerged below the surface of the acids, so as to have the exciting-surfaces of the metals directly opposed to each other, and also to prevent the acids from filtering through the porous cups above the upper surfaces of the zincs, and thereby establish local actions in the battery to neutralize the force of the main current.

Having now described my improvements, I will set forth what I claim and desire to secure by Letters Patent of the United States:

1. The use of the insulating-amalgam, substantially as described, in combination with the surfaces of the zincs of galvanic batteries for telegraphic purposes, for obtaining the results hereinbefore set forth.

2. The use of two or more independent strips of platinum in the construction of galvanic batteries for telegraphic purposes, as an improvement on the Grove battery, for the purpose of obtaining the results hereinbefore set forth; but irrespective of their use in combination with the insulated amalgamated zincs before described, I make no claim to them.

THOS. C. AVERY.

Witnesses:
W. J. BRUNDRED,
CHARLES L. BARRITT.